Nov. 23, 1948.　　J. H. HOMRIGHOUS　　2,454,651
SYNCHRONIZING SYSTEM
Original Filed Aug. 3, 1940　　　　　　5 Sheets-Sheet 1
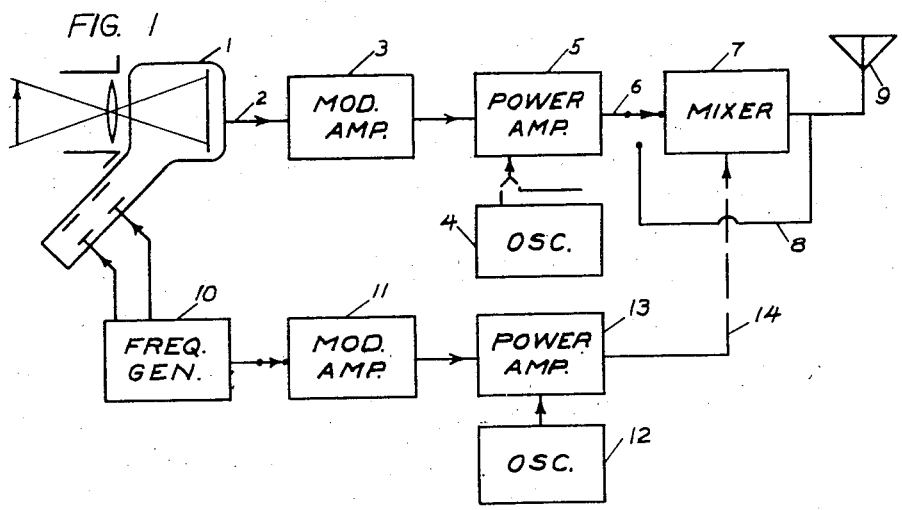
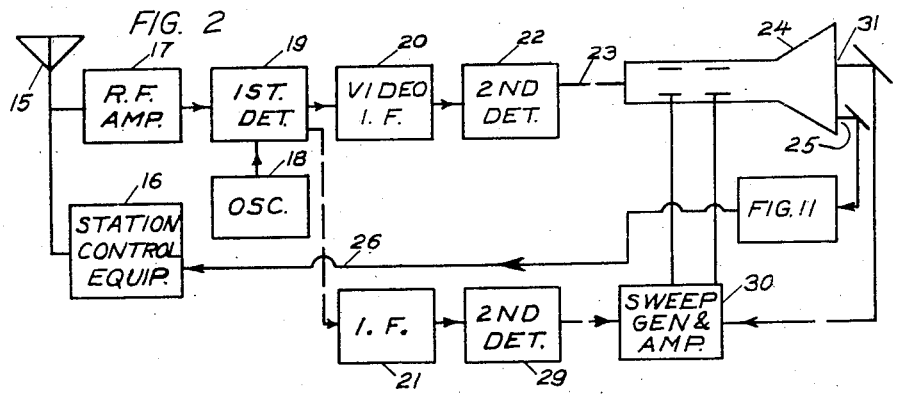
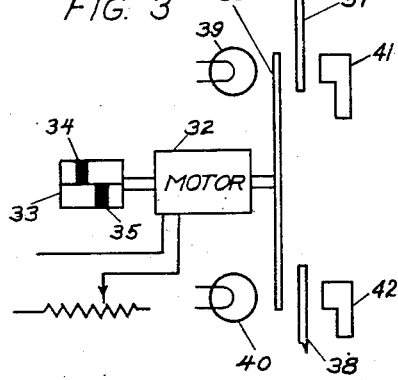
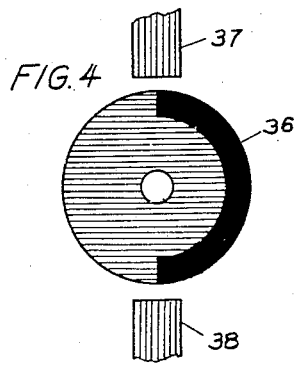
INVENTOR.

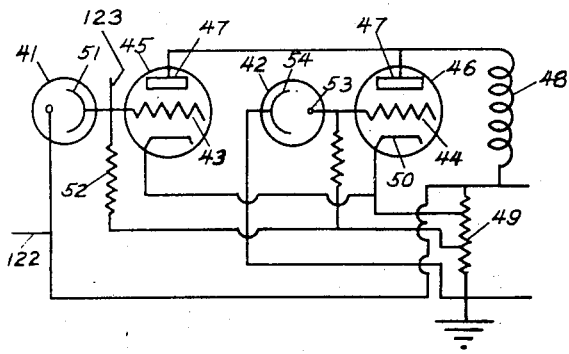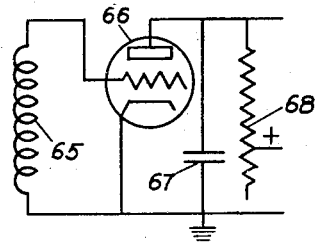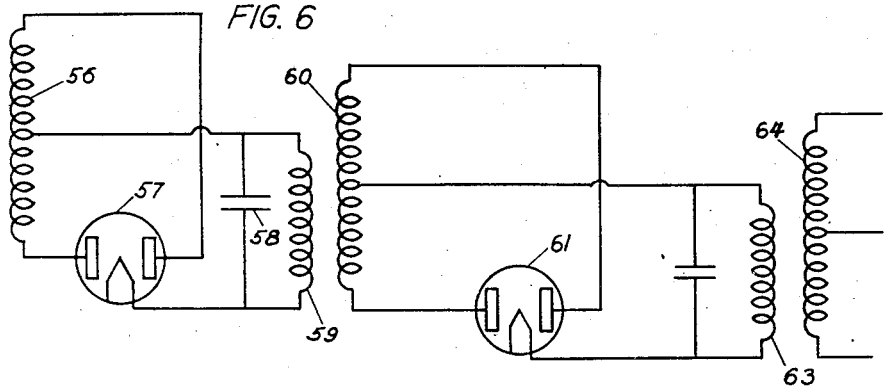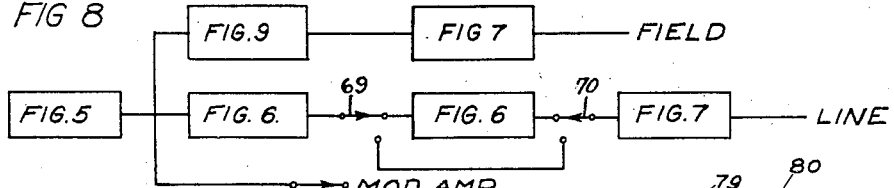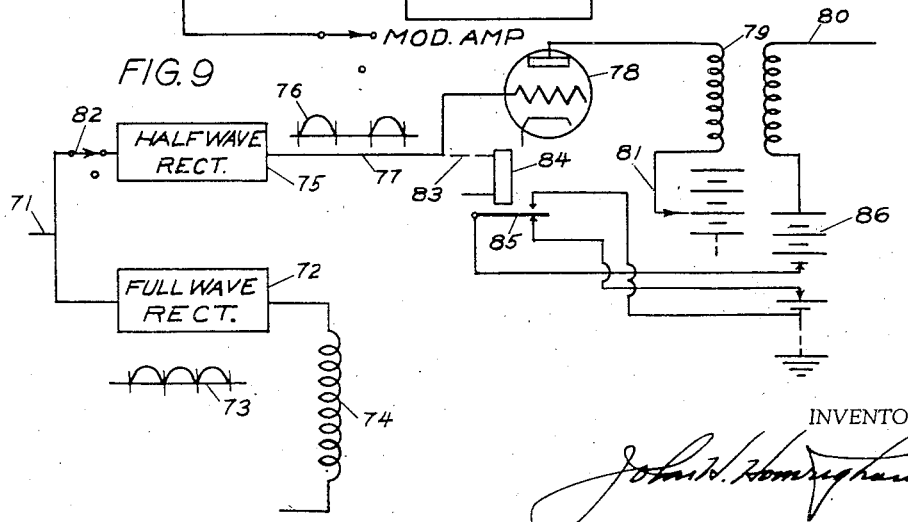

Nov. 23, 1948.          J. H. HOMRIGHOUS                2,454,651
                       SYNCHRONIZING SYSTEM
Original Filed Aug. 3, 1940                        5 Sheets-Sheet 3
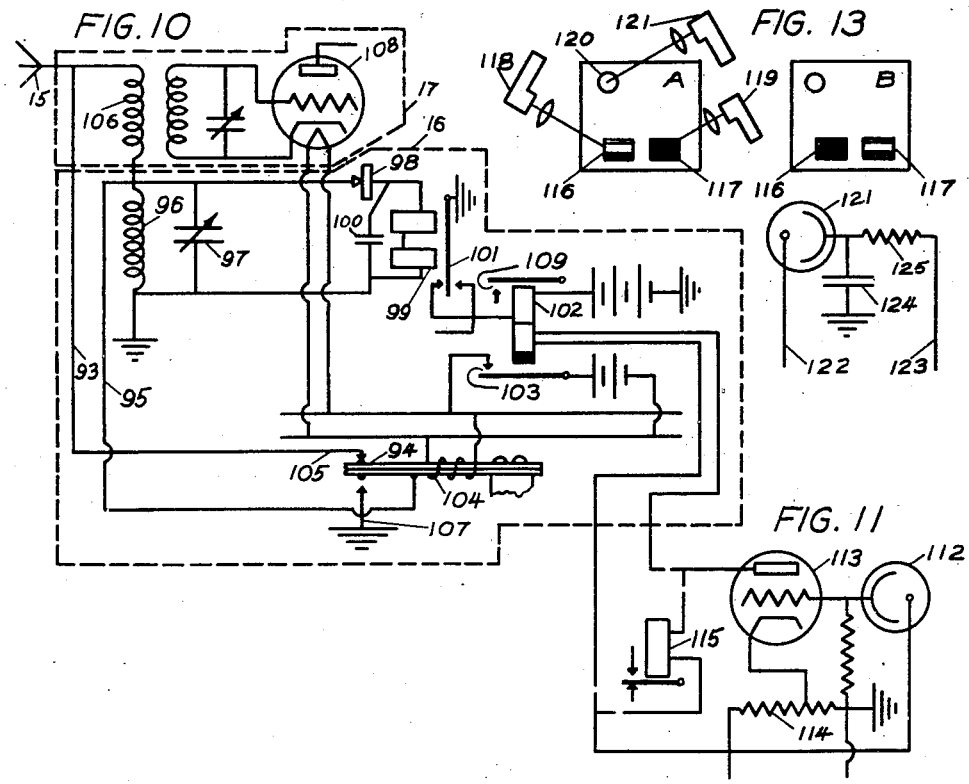
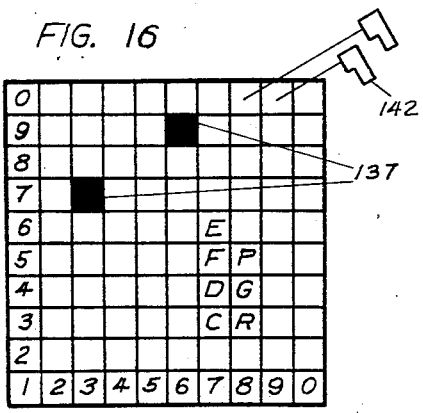
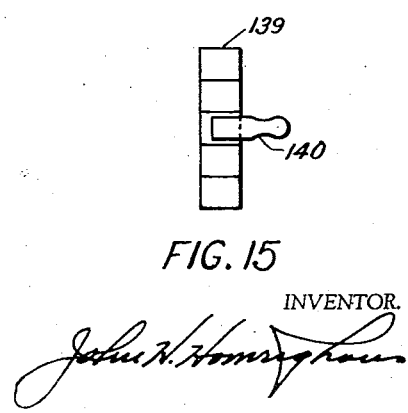
INVENTOR.
John H. Homrighous Nov. 23, 1948.     J. H. HOMRIGHOUS     2,454,651
SYNCHRONIZING SYSTEM
Original Filed Aug. 3, 1940     5 Sheets-Sheet 4
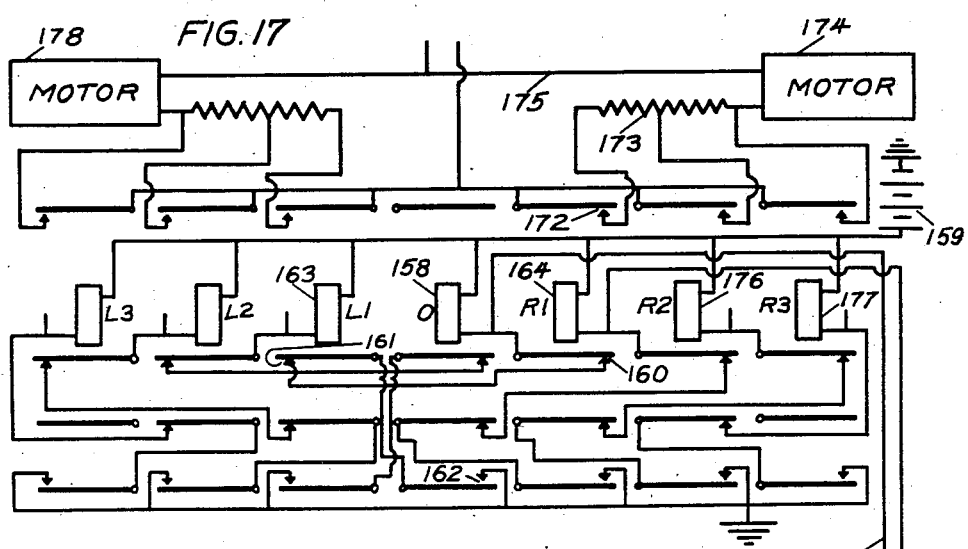
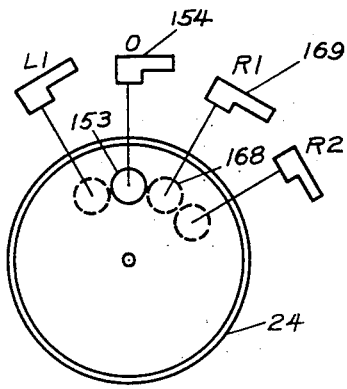
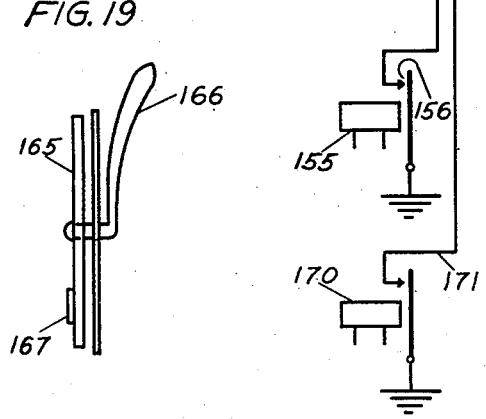
INVENTOR.

Nov. 23, 1948.   J. H. HOMRIGHOUS   2,454,651
SYNCHRONIZING SYSTEM

Original Filed Aug. 3, 1940   5 Sheets-Sheet 5

INVENTOR.
John H. Homrighous

Patented Nov. 23, 1948

2,454,651

UNITED STATES PATENT OFFICE 2,454,651

SYNCHRONIZING SYSTEM

John H. Homrighous, Oak Park, Ill.

Original application August 3, 1940, Serial No. 350,758, now Patent No. 2,369,783, February 20, 1945. Divided and this application April 26, 1943, Serial No. 484,570

13 Claims. (Cl. 178—69.5)

My invention relates generally to an improved method and system for controlling devices at a distance through the medium of radio and television.

Accordingly one of the main objects is the provision of a method for transmitting and reproducing control signals or codes as video or picture signals.

Another object of my invention is the provision of an improved means for controlling at a remote distance movable vehicles by televising certain characters or codes.

Still another object of the invention is to provide an improved system to control distant mobile equipment such as automobiles, aeroplanes, ships, with the aid of video television signals.

Several methods for transmitting control signals have been devised; one of these methods uses a code system of signals commonly known as the Baudot code, transmitted by the aid of radio.

In my present invention, picture or video signals are used giving a very large number of combinations of codes which also has the advantage of being a new and different system, and covers remote control of operable apparatus, in distant receiving stations either fixed or mobile, by transmitting signals in one or more recurring periods to individually control or select distant station apparatus.

This application is a division of application Serial Number 350,758, filed August 3, 1940, now Patent Number 2,369,783, issued February 20, 1945.

Many of the features shown in this application are shown and described in my prior Patent Number 2,309,393 issued January 26, 1943, and a divisional application Serial No. 470,039, filed December 24, 1942 and Patent 2,320,699 issued June 1, 1943, and a divisional Patent 2,398,642 issued April 16, 1946. In this application I have not shown a method for transmitting and reproducing sound, but it is to be understood that either of the methods shown in above noted patents may be used where desired between certain types of stations.

Other objects, features, and advantages of my invention will appear from the following description taken in connection with the accompanying drawings illustrating an embodiment thereof in which:

Figures 1 and 2 are simplified diagrammatic views of a television transmitting station and a television receiving station, respectively, illustrating the principles applied in this invention.

Figure 3 is a motor device for generating control frequencies.

Figure 4 is an end view of the disk shown in Figure 3.

Figures 5, 6, 7 and 9 are control circuits for scanning and interlace operations.

Figure 8 is a simplified diagram showing circuit figure numbers used in generating the sweep frequencies.

Figure 10 is a tune station control and circuit.

Figure 11 is a photo-electric tube circuit.

Figures 12 and 13 show picture or video control characters, reproduced at the receiver, and a photo tube circuit.

Figure 14 shows picture characters for use at the transmitter to produce definite frequencies.

Figure 15 shows frame and plug for producing code characters at the transmitter.

Figure 16 shows picture characters, or code reproduced at the receiver.

Figure 17 is a circuit for controlling the steering mechanism of mobile equipment.

Figure 18 shows an arrangement for utilizing the picture signals used in connection with Figure 17.

Figure 19 shows a device for originating picture signals at the transmitter.

Figure 20:
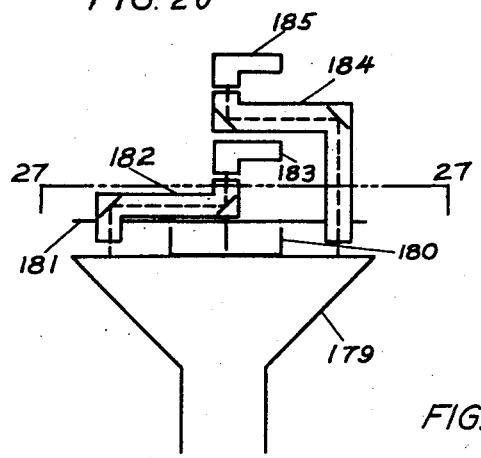
Figure 20 shows mechanism for translating picture signals into electrical energy.

In Figure 1 the numeral 1 designates a cathode-ray pick-up tube of the conventional type, and is known as an "iconoscope." It is to be understood that other types of tubes may be used such as the "orthiconoscope" developed for perpendicular scanning of all points on the mosaic; or the tube, known as the image dissector may be used instead of the one illustrated.

As shown the tube comprises a mosaic, photo-electric screen on which a light image of the object is projected and an electron gun for generating a ray of electrons directed at the screen, and two sets of deflecting plates for deflecting the electron ray at the line and field frequencies, so that it is caused to scan the screen. It is to be understood that electromagnetic means may be employed for deflecting the electron beam. The picture and certain other control characters are thereby developed and fed by an output connector 2 to a modulating amplifier 3.

A carrier wave is provided by an oscillator 4 in the power amplifier 5. The oscillator 4 may be arranged to supply several different frequencies or different oscillators may be switched in and out of the circuit in order that several carrier waves may be used. The carrier is modulated by the frequency band video or picture signals through the modulation amplifier 3. The signals from the amplifier 5 are supplied by a connection 6 to the mixing circuit 7. Certain control characters for governing the scanning action at the receiving set may be transmitted as video signals, as also covered in my prior Patent Number 2,309,393, and when this is done the signals from amplifier 5 are supplied by the connections 6 and 8 direct to the antenna 9.

The numeral 10 designates a generator for producing pulsating voltage waves or waves of sine form for controlling the sweep frequencies at the desired frame and line frequencies. These sweep frequencies are supplied to the deflecting plates of tube 1. The sine form waves may through the medium of amplifier 11 modulate another carrier produced by oscillator 12 in its amplifier stage 13. When it is desired by the operator to transmit a separate synchronizing frequency for controlling the scanning action at the receiver the signals from the amplifier 13 are fed to the mixer circuit 7 through the conductor 14.

The two carrier waves, one modulated by a single control frequency, the other modulated by video signals, are mixed in the mixer circuit 7 and fed to the common antenna 9 for transmission by radio.

The control signals are transmitted in the form of a sine wave which are changed or rectified at the receiving station before they are used to synchronize the scanning action with the transmitter.

The antenna 15, Figure 2, receives the carrier signals from the transmitter antenna 9 to a tuned station control equipment circuit 16. These signals may come in over a single carrier whenever the control voltages are to be generated from the picture signals, or two carriers may be employed when it is desired to have the control for the sweep signals transmitted as a definite frequency on a sub carrier.

The tune station control circuit 16 functions only when a carrier modulated by a particular frequency is received, to switch the incoming signal from the tuned station control circuit to the radio frequency amplifier 17 and to close the battery supply to the receiving set.

An oscillator 18 reacts with these signals in the first stage 19 on the superheterodyne principle to produce in one case a single intermediate frequency signal which is supplied to the video intermediate stage 20 and at stations operating from two carriers, the oscillator 18 reacts with these two signals in the stage 19 to produce two intermediate frequencies wich are fed to the two stages 20 and 21.

After suitable amplification, the video signals are detected at 22 and fed by a connection 23 to a reproducing or picture tube 24. The device 24 is represented as being in the form of a cathode ray tube of well known construction, and comprises a fluorescent screen, an electron gun for developing a ray of electrons directed toward the screen, and two sets of electrostatic plates for deflecting the electron ray at the line and field frequencies to cause it to scan the screen. It is to be understood that electromagnetic means may be employed for deflecting the electron beam.

The video signals are applied to a control electrode of the electron gun to change the intensity of the electron ray in accordance with picture or video signals.

Blanking signals may be obtained in accordance with the system shown in my prior Patent No. 2,320,699.

The picture tube 24 reproduces a certain character at 25 which is picked up by the photo-tube shown in the circuit of Figure 11 which in turn operates over connection 26 to a holding device in the station control circuit 16 whereby the apparatus will continue to be supplied with battery until such time as the transmitter either goes off the air or the image for producing the character at 25 is no longer transmitted.

Referring to the intermediate frequency stage 21, which in certain instances may receive the control signals and through the action of the second detector 29 the output of which is a voltage wave of sine form that is fed to the sweep generator and amplifier circuit 30 where after suitable amplification it is changed or rectified and used to control the vertical scanning and this output voltage wave is also used to produce a higher frequency for synchronizing horizontal line scanning in the amplifier generator device 30 using circuits similar to those used in the transmitter, which will be explained in more detail later.

The picture control characters reproduced at 31 and supplied to suitable photo-tube circuits are for generating the synchronizing frequencies at the receiving station, thereby eliminating the necessity of transmitting control frequencies. This will also narrow the frequency band required.

Referring to Figure 3, the numeral 32 represents a motor which is operated from the local power supply and has a variable speed from approximately 1500 R. P. M. to 1800 R. P. M. or one revolution per frame. The drum 33 has two black bands 34 and 35 each of which extends over one half of the periphery and are located adjacent the opposite edges of the drum 33 which drum is directly connected to the motor shaft so that by rotating it in front of the transmitting tube 1, two short black lines will appear alternately, but separated on the mosaic which will be reproduced at the picture tube in the receiving set as shown in Figure 13 and are used for controlling the sweep frequencies which will be further explained later.

Thus it will be seen that each mark or sign on the mosaic is definitely identified with a field and that it is also definitely related to the speed of the motor which is two fields per revolution.

Connected to the motor shaft, is a disk of light polarizing material 36, revolving past stationary pieces of light polarizing material 37 and 38 and also separate sources of light 39 and 40 respectively.

The revolving and stationary members are better shown in Figure 4. The disk 36 is of polarizing material, having a certain part painted or blocked out so that by rotating it in a clockwise direction past its stationary members of polarizing material 37 and 38 and between its sources of light 39 and 40 and their respective photo-cell 41 and 42 the intensity of the light reaching each photo-cell will uniformly vary from zero value to maximum value and back to zero during one half of a revolution and during the other half of the revolution there will be no light change.

The photo-cells 41 and 42 are placed 180 degrees apart and changes in intensity of light will alternately affect each photo-cell.

A system for producing the proper sweep frequencies is shown in Figures 5 to 9 inclusive.

Referring to Figure 5 I have shown a circuit for producing an alternating current from the variations of light occurring in the photo-cells 41 and 42 which are the photo-cells shown in Figure 3. These photo-cells control the grid excitation of grids 43 and 44 of amplifier tubes 45 and 46. The anodes 47 are connected in parallel through the primary transformer winding 48 to the positive side of voltage divider 49. The cathodes 50 are connected in parallel to an intermediate point of the voltage divider 49. The cathode 51 of photo-cell 41 is connected to the grid 43 of tube 45 and through resistance 52 to negative potential at the voltage divider, thereby maintaining the grid 43 at a negative potential with respect to cathode 50 and plate 47. The circuit is so arranged, therefore, that an increase in the intensity of light on the photo-cell 41 will increase the output current of tube 45. The photo-cell 42 has its anode 53 connected to the grid 44 of tube 46, and it is maintained at a positive potential with respect to its cathode 54. This causes a decrease in the current of tube 46, upon increasing the intensity of light directed toward the photo-cell 42 other amplifier tubes may be connected in parallel to increase the output.

Therefore since the plate circuits of tubes 45 and 46 are in parallel the rotation of the disk 36 will alternately operate the photo-cells 41 and 42 to produce a continuous riding and falling current in the primary winding 48 of a transformer whereby alternating voltages are induced in the secondary winding.

When it is desired to control the receivers by a definite frequency from the transmitter these voltage waves generated by Figure 5 are modulated on a sub carrier as explained in connection with Figure 1 and are transmitted by radio to the receiving set to control or trigger the field and line saw tooth waves for controlling the deflection of the electron ray in the receiving tube. These voltage waves are also used to control or trigger the line and field saw tooth waves at the transmitting tube.

In this invention I employ frequency multiplying circuits for the purpose of producing the high frequency required for horizontal line scanning. The field frequency is obtained as described above and from these frequencies the higher line frequencies are produced.

Referring to Figure 6, two stages of frequency multiplications are shown. The secondary 56 is inductively connected to the primary winding 48 in Figure 5 to supply alternating pulses to the tapped secondary and in turn to the full wave rectifier tube 57 which delivers twice the number of pulses or cycles to the tuned filter comprising the condenser 58 and the next transformer primary winding 59. This double cycle signal is supplied by the tapped secondary 60 to the full wave rectifier tube 61, where it is again doubled and fed to the succeeding transformer primary 63. The tapped secondary 64 delivers alternating current to the next stage and so on until the desired high frequency for line scanning is obtained.

In this invention I prefer to use doublers and obtain an even number of lines per field or frame and for interlace scanning each field would have an even and equal number of lines.

From the above it will be seen that by changing the speed of the motor in Figure 3 the number of fields or frames per second would be changed but the number of lines per field would remain the same.

To produce the desired output wave of saw tooth form for field and line scanning, I employ a grid controlled discharge tube circuit shown in Figure 7, where voltages induced into the transformer secondary winding 65 drive the grid of tube 66 positive, discharging the condenser 67 through the tube 66. Thus by alternately charging the condenser 67 through the resistance 68 and discharging it through the tube 66 of a saw tooth voltage is generated.

In Figure 8, I have shown, diagrammatically, the circuit figure numbers used to produce the required frame and line frequencies; several circuits of Figure 6 may be used but it is to be understood that this circuit may represent only one stage.

With further reference to Figure 8, I have provided two switches 69 and 70 for shorting out one or more stages of doublers so that the horizontal lines may be varied at the will of the operator. One of the switches or keys may also change the voltage on the focusing electrode in the CR tubes to thereby change the size of the spot of electrons on the screen.

The diagrammatical arrangement of circuit figure numbers shown in Figure 8 will be the same arrangement of circuits employed at the receiver when control frequencies are developed from characters reproduced on the screen of the picture tube. However, when a sine form voltage wave is transmitted to govern the scanning action at the receiver the schematic arrangement will be the same, except Figure 5 should be omitted.

In the present invention in order to produce interlace scanning from a sine form voltage wave it is necessary to identify every other field and in some manner cause the horizontal lines of one field to fall in between the lines produced in the second field or the lines of one field are even numbered and in the second field they are odd numbered.

In order to accomplish the interlace features noted above, I employ the circuit shown in Figure 9. In this circuit voltage waves of sine form are supplied from the circuit of Figure 5 or are transmitted to the receiving set as previously explained in connection with Figure 2, over the conductor 71 to a full wave rectifier 72 of conventional design. The output wave form is shown at 73. These pulses are fed through the primary winding 74 of a transformer to the wave forming circuit Figure 7, to drive the grid of tube 66 positive discharging condenser 67, thereby producing saw tooth waves for vertical scanning.

These circuits are so arranged that the timing or synchronizing pulses are also the trigger pulses for the discharge tube whereby the retrace is initiated.

In multiple with the full wave rectifier 72 is a half wave rectifier 75 having an output wave form as shown at 76. The pulses from the rectifier 75 are supplied by connection 77 to an amplifier 78, the output of which is connected through a transformer winding 79 to battery. These pulses will induce in the secondary a voltage which will alter the potential in conductor 80 from that furnished by the battery 86 for the duration of each pulse. The lead 80 supplies potential to one of the vertical deflecting plates of the cathode ray tube 24, Figure 2, through a variable resistance (not shown) for centering or adjusting the vertical movement of the electron spot. Another lead from the battery 86 would supply potential to the opposite vertical deflecting plate through another resistance. The potential on the plate of amplifier 78 is adjustable at 81, depending upon the space between even or odd lines.

The half wave rectifier 75 and the amplifier 78 will operate during each positive pulse to increase or decrease the potential on one of the vertical deflecting plates without changing the potential on the opposite deflecting plate which will have the effect of raising or lowering the horizontal lines.

From the above description it will be seen that I have provided means for interlace scanning or for shifting the position of the horizontal lines scanned in a cathode ray tube, during alternate field pulses, eliminating any necessity of transmitting by radio synchronizing pulses, other than one sine form wave of field frequency.

From the above description it will be seen that the line pulses are definitely locked with the field pulses, or in other words, the same pulse that triggers the vertical deflection also, through multiplying circuits, supplies the trigger pulses for line scanning.

Furthermore, from the above description, the control of the field and line deflecting circuits at the receiver from the sine form voltage wave transmitted by radio from the transmitting station will cause the cathode ray or electron ray in the viewing tube to be in exact synchronization with the cathode ray in the pick-up tube whenever the receiving station is tuned to the proper carrier wave.

At any time or instant that the receiver is tuned to the same carrier wave of the transmitting station, the deflecting circuits will automatically be in step. Suppose that at a certain instant the cathode ray or electron ray in the pick-up tube is focused on mid-point of line number 175. Now, since a single frequency or control voltage wave generated at the transmitter station times the deflection of both the field and the horizontal lines at both the transmitting station and receiving station, the cathode ray at the viewing tube would automatically be focused at the mid-point of line 175 on the screen of the viewing tube, and furthermore, since I have provided through the medium of a half wave rectifier, Figure 9, means for associating the positive pulse in each cycle of the control voltage wave with a certain field, the focused electron ray in each tube would also fall in the proper vertical location in each field. The picture or symbols produced from this system will be approximately as high as they are wide since there is very little need of reserving space at the bottom of the picture for synchronizing pulses.

With further reference to Figure 9, the switch or key 82 is thrown to off position whenever it is desired to send pictures or symbols by progressive scanning, in which case there would be no need for changing the position of the horizontal lines in the fields.

In some cases it may be desirable to operate the movement of the electron beam at a slow rate and for that purpose I have provided at the receiver an optional feature, or the positive pulses from the connection 77 Figure 9 are fed through connection 83 to a relay 84 instead of going through the tube 78. This relay 84 operates its spring 85 upon receiving a positive pulse to change the potential of battery 86 which battery is supplied to one of the vertical deflecting plates through a variable centering resistance and as previously explained in connection with the tube 78 this potential change causes the lines of one field to fall in between the lines of a second field.

From the preceding explanation it will be seen that many combinations may be derived, for instance, at certain predetermined time intervals during the day messages or pictures may be transmitted by progressive scanning; other time intervals interlace scanning may be used. The field frequency may be changed from slow to fast and vice versa at the option of the operator at the transmitting station; also the number of lines per field may be changed at predetermined intervals.

Referring to Figure 10, I have shown a station control stand-by circuit or, in other words, a circuit that will only operate when the proper carrier wave is received and normally this circuit is without battery drain. The modulated carrier is received from the antenna 15 over conductor 93, spring 94, conductor 95 to the receiving tuned station circuit consisting of the following equipment: an antenna coil 96 and condenser 97 which may be adjusted for various carriers and a crystal detector 98 which may be a tube detector provided with a power supply. After detection the signals are supplied to a relay or auxiliary device 99 which operates in the low or audio frequency range and may be similar to the one shown in my prior application Patent Number 1,460,814. The number 100 represents a by-pass condenser.

The carrier at the transmitter is first modulated by a particular frequency for a short interval of time. The method of modulation to be more fully explained later. The duration of this preliminary frequency will actuate the spring 101 and close the circuit to the slow acting relay or switching device 102. The relay 102, in operating its springs 103, closes the battery supply circuit to all the tube filaments in this receiving set, and also to the heating element 104 for controlling the bimetal spring 94. The relay 102 will remain energized through the action of spring 101 during the interval of the low frequency modulation or until such time as the bimetal spring becomes sufficiently heated from its element 104, to deflect and open the circuit to the antenna coil 96, at follow-up spring 105 and to place ground on the antenna coil 106 through the closing of spring 94 and 107.

The operation of the bimetal spring 94 to switch antenna coils from coil 96 to coil 106 is slow in order to allow some time for the filaments of the several receiving tubes (one tube shown at 108) to become sufficiently heated for proper operation. At the time of the switch over the preliminary frequency received over the antenna should be ended and video signals for code operation and other controls should be received from the antenna on the same or a different carrier and developed in the receiving set equipment.

The operation of relay 102 also closes the B battery supply to the anode circuits for the several receiver tubes at springs 109. The relay 102 must remain in an operated position during the transmission of video signals. One method used to accomplish this feature is to provide a photo-cell 110 Figure 12 to pick up a beam of light at a particular spot or location on the screen of the viewing tube and as shown at 111. This spot or point 111 is under the control of the operator at the transmitter and may be produced from one of the marks on the drum 33 Figure 3 or it may be produced in a manner to be described in connection with Figure 15. Referring to Figure 11 I have shown a photo-cell 112 which may be the photo-cell 110 in Figure 12. This cell is responsive to variations of light intensities and will also permit current to flow when exposed to a steady beam of light of sufficient intensity. Light directed toward the photo-cell will change to the grid potential of amplifier tube 113. The anode of tube 113 is connected through the lower winding of relay 102 to the positive terminal of the voltage divider 114. Therefore a steady light on the spot 111 directed toward the photo-cell 112 will cause current to flow in the lower winding of relay 102, thereby maintaining the relay operated as long as the spot 111 remains illuminated to release the receiving set all that is required is to transmit signals to make the spot 111 dark which will release the relay 102 and also render the receiving station inoperative until it is again signaled as previously described.

The anode of tube 113 may be connected through the winding of another relay 115 instead of a winding of relay 102. The spot 111 may be placed at different locations on the tubes of different receiving sets so that any one of a number of receiving sets operating on the same carrier may be released independently of the other receiving sets. By keeping the spot 111 dark for a short or indefinite interval the relay 102 will release opening the battery supply to the various tubes.

With reference to Figure 13 I have shown two fields, A and B, reproduced at the viewing tube showing control characters or marks 116 and 117. These marks or characters are produced by rotating the drum 33 Figure 3 in front of the transmitting tube. The marks 116 and 117 will alternate from light to dark and back to dark again, or the mark 116 field A will be light and in field B it will be dark while mark 117 is the reverse from this or at the time of field A mark 117 will be dark while mark 116 will be light.

Light from these characters 116 and 117 is directed through suitable lenses to photo-cells 118 and 119 respectively, which may be the photo-cells 41 and 42 shown in the circuit of Figure 5. These photo-cells will operate in the circuit of Figure 5 to alternately increase and decrease the current in the primary winding 48 as previously described, whereby the field and horizontal line scanning frequencies are produced at the receiving stations using the figure numbers as shown in Figure 8.

In my prior application Patent #2,309,393 the characters for producing synchronizing frequencies were developed at the rate of picture or frame frequency instead of as shown and described in this application of having the characters developed at the rate of field frequency.

With further reference to Figure 13, some means must be provided for automatically starting the vertical scanning operation when the sweep frequencies are controlled from characters reproduced at the unattended receiving station. When the battery at the receiver is first switched on the electron beam in the cathode ray tube will be directed toward the upper left corner of the viewing tube as indicated by the spot 120. The fields A and B in Figure 13 are shown rotated 180 degrees or like they would appear on the mosaic at the transmitting tube, therefore the scanning would start from the lower right hand corner and progress toward the left and top in Figure 13. The electron ray will rest at this point 120, which may be an adjustable location outside of the normal picture area, since the horizontal and vertical deflecting condensers (like 67 Figure 7) have been charged to maximum capacity which would cause the electron ray to be deflected farther than normal. The discharge of these condensers is accomplished by modulating test pulses on the carrier by placing a test field or pattern in front of the transmitting tube. The light caused by the impact of the electrons at the spot 120 during the sending of one preliminary test field is directed through suitable lenses to the photo-tube 121 which is in multiple with the photo-tube 41 Figure 5, through conductors 122 and 123.

The sender or test pattern placed in front of the transmitting tube is similar to the reproduced picture or field in Figure 13 except that the top of pattern would be dark gray in color, gradually fading to white at the center and from the center toward the lower edge it would gradually get darker and at the bottom of the pattern or chart it would be black, which is the same as the upper half of Figure 14. From the above it will be seen that the spot 120 would gradually vary in light intensity which would give the first trigger pulse to the sweep control circuits of Figure 5. The function of by-pass condenser 124 and the resistance 125 is to prevent the operation of the sweep control circuits from high frequency pulses caused by scanning and also by gap or retrace between horizontal lines.

The test pattern after an interval of a few fields would be taken away from transmitting tube but the reproduction of the marks or characters on the drum of Figure 3 would still continue during the sending and receiving of any other information.

Two synchronizing systems whereby two distinct and different methods for keeping the receiving station in step with the transmitting station have been shown and described, one system makes use of a separate frequency transmitted from the sending station, while the other system uses characters transmitted as pictures. Both of these systems can be in operation at the same time from a single transmitter, whereby each type of receiving station can be utilized to receive the same message simultaneously or either type of receiver can be prevented from receiving all or any part of a message. Furthermore the receiving station may at first be synchronized by a frequency modulated on a separate carrier and at any time subsequent thereto the frequency can be discontinued and then the receiver can be controlled from marks or characters in the picture.

With reference to Figure 16 I have shown a system for producing various combinations of numbers or locations reproduced on the screen of a viewing tube, horizontal rows are numbered from bottom up, and vertical columns are numbered left to right, and as shown, the squares 137 indicated black reading up and across would be seventy-three and ninety-six. Several of these squares may be used at one time and for various purposes.

These symbols may be used for transmitting various forms of information. For instance, certain sets of numbers may control a robot vehicle, and still others may be used for telegraph or Boudet Code symbols. The alphabet may be used similar to that shown where C is number thirty-seven, E is number 67, etc., giving an almost unlimited number of combinations.

Figure 16 shows the pattern that may be reproduced at the viewing tube. It is to be understood that this pattern will be reversed at the transmitting tube on account of the lens system.

The numeral 139 Figure 15 shows a side view of the frame work for producing the desired images upon the mosaic of the camera tube. This structure consists of very thin material placed together forming hollow squares, one hollow square for each two number location. The numeral 140 represents a square peg having a black face. These pegs are placed in the hollow squares when it is desired to transmit some certain square area as black and all others as white.

At the unattended stations using this code system for controlling robots or explosives, I provide a photo-cell such as 141 and 142 Figure 16 for each location naught eight and naught nine that is to be used for governing the time of the explosion of a bomb or a mine. Either of these photo-cells may be substituted for the photo-cell 112 in the circuit of Figure 11.

The circuit shown in Figure 17 is for controlling the steering mechanism of vehicle equipment by televising certain signs or symbols.

With reference to Figure 18 which shows reproduced characters on the viewing tube 24, the spot 153 which has been transmitted as white reflects light into its associated photo cell 154. This photo cell in a circuit similar to that of Figure 11 will operate its relay 155, Figure 17, to place ground through its spring contacts 156 and over conductor 157 through relay 158 to battery 159. The relay 158 will close its contacts and place ground on its winding through contacts 160, 161 and 162, thus holding relay 158 in energized position which is the proper condition for the vehicle to move straight ahead. The relay 158 will remain locked up until such time as either relay 163 or 164 is energized to control a turn to the left or a turn to the right, at which time the operator at the transmitter would rotate the black faced circular disk 165 Figure 19 which is in front of the pick up tube 1 Figure 1, by the handle 166. The rotation of this disk moves the white spot 167 to another location which will be reproduced at the viewing tube. It is assumed that the operator desired to direct the moving vehicle toward the right facing the direction of travel, which would place the light spot on the viewing tube at 168 Figure 18. Thus, its associated photo-cell 169 would cause relay 170 in a circuit similar to Figure 11 to become energized, placing ground over conductor 171 through relay 164 to battery 159. Relay 164 will operate its spring contacts at 160 to open the circuit of relay 158, and closes the motor power supply at contact 172 through resistance 173 right turn motor 174 and conductor 175 to the source of current. The motor 174 will run slowly turning a rudder or other steering mechanism. Should it be desired to make the right turn faster by further rotating the disk 163, relay 176 or 177 would be energized in exactly the same manner as explained for the relay 164. The operation of the contact spring of relays 176 and 177 would cut out part or all of the resistance 173 allowing the motor 174 to increase its speed.

Should it be desired to turn left the white spot 167 would be turned so that the light spot on the viewing tube would appear on the left side. This would actuate the left turn relays such as 163, which in turn would start the left turn motor 178 and run it slowly or rapidly depending upon the wishes of the remote operator. These left turn relays would be controlled in a similar manner described for the right turn relays.

With reference to Figure 20, I have shown a video or picture operated mechanism for remotely controlling or steering a vehicle. The numeral 179 represents a viewing tube secured to the vehicle in a vertical position which may be the tube 24 Figure 2. On top and in the center of this viewing tube is the base of a compass 180 having a needle 181. Secured on top of the compass needle 181 is a square tubing 182 having mirrors on the inside corners to direct a beam of light from the cathode ray screen to a photo-cell 183. On the opposite end of the compass needle is another square piece of tubing 184 provided with mirrors on the inside corners to direct a ray of light to a photo-cell 185, which is directly over the photo-cell 183.

Figure 22:
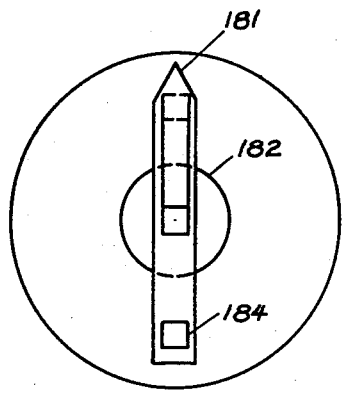
Figure 22 is a top view of the cathode ray tube and compass shown in Figure 20.

Figure 22 shows a top view of the compass and the cathode ray tube 179.

Figure 21:
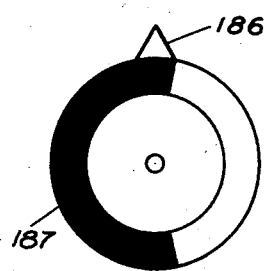
Figure 21 shows a control character or pattern, reproduced at the receiving tubes.

Referring to Figure 21, I have shown a pattern on the viewing tube for controlling the operation of a vehicle. This pattern may be originated at the transmitting tube by having a similar design painted on the inner face of the disk 165 of Figure 19 which may be rotated in either direction to any degree or angle so that the control of the remote vehicle may be directed through any desired angle rather than in steps as described in connection with Figure 17.

Figure 23:
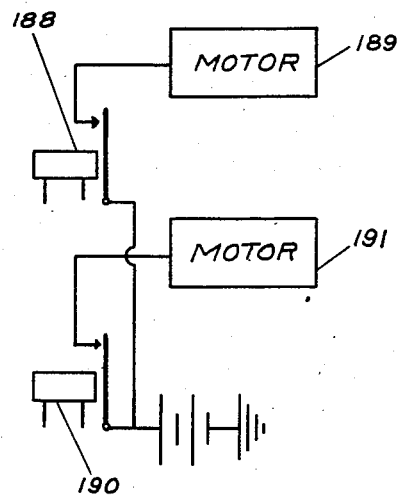
Figure 23 is a circuit used in connection with Figure 20.

With reference to Figures 20, 21 and 22, the viewing screen or the top of the tube 179 is in a stationary horizontal position and may have a permanent mark 186 pointing to the front of vehicle. But the pattern on the screen can be rotated either clockwise or counter-clockwise. Let us assume that the compass and vehicle both point exactly north and that the pattern on the screen is as shown in Figure 22, then the opening in the tubing 182 would be over a dark area of the reproduced ring 187 and the opening in tube 184 would also be over a black area in the ring 187 in which case the vehicle would move straight north. Now suppose it is desired to go northeast. Then the design or pattern on the screen is rotated in a counter-clockwise direction to any angle which exposes the opening in tube 182 to a white or light area of the ring 187; this light upon reaching the photo-cell 183 will energize a relay 188 Figure 23 through a photo-cell circuit similar to that of Figure 11 and needs no further explanation. The relay 188 upon energizing places battery upon the motor 189 which will operate to turn the vehicle including the cathode ray tube 179 until the black area which is reproduced is under the openings in the tubings leading to both photo-cells 183 and 185. The compass needle 181 holding the tubing for directing ray of light to the photo-cells 183 and 185 remain practically stationary or pointing toward the north instead of pointing toward the front of vehicle. Should it be desired to move the vehicle in a northwest direction the pattern on the screen of the viewing tube would be rotated in a clockwise direction from the transmitting station which would allow photo-cell 185 to pick up a ray of light from the white surface reproduced. The photo-cell 185 upon finding light would cause another relay 190 to become energized, closing the power supply to the left turn motor 191 which in turn will cause the vehicle and the tube 179 to turn until both photo-cells 183 and 185 fail to receive reflected light from the screen.

From the above description it will be seen that at whatever angle the picture or pattern on the viewing screen may be rotated, the vehicle will automatically adjust its motors to move the vehicle in the predetermined direction.

From the above description it will be seen that a vehicle may have several methods or types of control, each of which may be operated independently of the other. For illustration, suppose the operator at the transmitting station may be operating a vehicle by the means shown in Figure 18 and then at his own option he may switch the control of the vehicle to the means shown in Figure 25.

I do not intend that the present invention shall be restricted to the arrangement of parts or to the particular form as herein set forth, but contemplate all modifications and changes therein within the terms of the appended claims.

Having thus described my invention, I claim:

1. In a system of distant control, a cathode ray tube having an image screen, said tube provided with suitable networks for producing images in different discreet areas on its associated screen from received picture signals, a pair of electric motors, a source of current supply, a plurality of photo-electric devices for each of the said motors, each of the said devices sensitive to different intensities of light from a different one of said image areas, and means controlled by said devices for electrically connecting the said source of current supply to either one of the said motors to rotate it at different speeds in the same direction.

2. In a system of distant control, a cathode ray tube having an image screen, said tube provided with suitable networks for producing images on its associated screen from received picture signals, a pair of electric motors, and means responsive to light from successive locations of the images on the said screen to rotate either one of the said motors independently of the other.

3. In a system of distant control, a cathode ray tube having an image screen, said tube provided with suitable apparatus and circuits for producing images on its associated screen and for progressively moving the location of the images thereon from received picture signals, an electric motor, and means responsive to light from the different positions of the images on the said screen to rotate the said motor at different speeds in the same direction.

4. In a system of distant control, a cathode ray tube having an image screen, said tube provided with suitable apparatus and circuits for producing images on its associated screen and for rotating the images in a circular path from received picture signals, an electric motor, and means responsive to the rotating images on the said screen to continuously rotate the said motor in the same direction.

5. In a system of distant control, a cathode ray tube having an image screen, said tube provided with suitable apparatus and circuits for producing images on its associated screen and for rotating the images thereon in either a clockwise or counter-clockwise direction from received picture signals, a pair of motors, means responsive to the clockwise movement of the images on the said screen to rotate a first one of the said motors, and means responsive to the counter-clockwise movement of the images on the said screen to rotate a second, the other one of said motors independently of said first motor.

6. In a system of distant control, a cathode ray tube having an image screen, said tube provided with suitable apparatus and circuits for producing images on its associated screen and for changing the images thereon from received picture signals, an electric motor, a source of current supply, a relay, and a photoelectric device sensitive to the changing images on said screen for energizing the said relay to thereby electrically connect the said source of current supply to the said motor, whereby said motor is rotated to in turn rotate said tube relative said device.

7. In a system of distant control, a cathode ray tube having an image screen, said tube provided with suitable apparatus and circuits for producing patterns in the images on its associated screen and for moving the said pattern in successive images from received picture signals, a photo electric device, a compass provided with mechanism for directing light from successive locations of the said pattern on the screen toward the photo electric device, an electric motor, a source of current supply, and means controlled by said device for electrically connecting the said source of current supply to the said motor.

8. In a television system, a cathode ray viewing tube provided with a screen, a main receiver provided with suitable apparatus and circuits for producing images on said screen from received picture signals, an energizing circuit for said main receiver, an auxiliary device operated by received signals, a current supply circuit, control means operated by said device for electrically connecting the said current supply circuit to the said energizing circuit, means for impressing upon said main receiver a predetermined carrier modulated by said picture signals to produce said images, a motor, a source of current supply, a photo electric device sensitive to changes in the images on said screen, and means controlled by said photo electric device for electrically connecting said source of current supply to the said motor.

9. In a remote control system, a cathode ray tube having an image screen, an energy absorbing receiver comprising apparatus and suitable circuits for reproducing a rotating pattern on said screen from received signals, a rotatable member, and means controlled by said rotating pattern to rotate said member, whereby said tube is rotated around an axis perpendicular to said screen.

10. In a remote control system, an energy absorbing receiver comprising apparatus and suitable circuits for producing a rotatable pattern on an image screen from received signals, a compass disposed across said pattern, means for rotating said pattern from received signals, and means for rotating said receiver relative to said compass under the control of said rotating pattern.

11. In a remote control system, a receiver supported in a movable object, a cathode ray tube for said receiver having an image screen and an electron ray directed toward said screen, means for causing the electron ray to scan said screen to produce a rotatable pattern thereon from received signals, a compass adapted to rotate in a plane parallel and adjacent to said screen to maintain its direction toward the north, and means for rotating said tube including its supports relative to said compass under the control of said pattern.

12. In a system of distant control, a radio receiver having at least a first circuit closing relay and a second circuit closing relay with suitable circuits controlled from the output of the receiver, a source of current, a plurality of motors, a first one of said motors having an energizing circuit adapted to be connected to said source of current by operation of said first relay and a second one of said motors having an energizing circuit adapted to be connected to said source of current by operation of said second relay; and means in said receiver to receive different sets of control signals, a first set of said signals to actuate said first relay, thereby rotating said first motor, and a second set of said signals to actuate said second relay, thereby rotating said second motor.

13. In a system of distant control, a radio receiver having a plurality of circuit closing relays with suitable circuits controlled from the output of the receiver, a source of current, an electric motor having a number of different energizing circuits, a first one of said energizing circuits under control of a first one of said relays to connect said motor to said source of current, and a second one of said energizing circuits under control of a second one of said relays to connect said motor to said source of current; and means in said receiver to receive different sets of control signals, a first set of said signals to actuate said first relay for rotating said motor, and a second set of said signals to actuate said second relay for changing the speed of said motor.

JOHN H. HOMRIGHOUS.

REFERENCES CITED

The following references are of record in the file of this patent:

UNITED STATES PATENTS

| Number | Name | Date |
|---|---|---|
| 1,660,711 | Jenkins | Feb. 28, 1928 |
| 1,747,664 | Droitcour | Feb. 18, 1930 |
| 2,057,773 | Finch | Oct. 20, 1936 |
| 2,176,136 | Hoyt | Oct. 17, 1939 |
| 2,237,440 | Jones | Apr. 8, 1941 |
| 2,265,779 | Ressler | Dec. 9, 1941 |

FOREIGN PATENTS

| Number | Country | Date |
|---|---|---|
| 352,035 | Great Britain | June 22, 1931 |